(12) United States Patent
Yoshii et al.

(10) Patent No.: US 12,266,785 B2
(45) Date of Patent: Apr. 1, 2025

(54) SECONDARY BATTERY

(71) Applicant: Panasonic Intellectual Property Management Co., Ltd., Osaka (JP)

(72) Inventors: Kazuhiro Yoshii, Osaka (JP); Takahiro Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 649 days.

(21) Appl. No.: 17/441,491

(22) PCT Filed: Jan. 27, 2020

(86) PCT No.: PCT/JP2020/002662
§ 371 (c)(1),
(2) Date: Sep. 28, 2021

(87) PCT Pub. No.: WO2020/195091
PCT Pub. Date: Oct. 1, 2020

(65) Prior Publication Data
US 2022/0181606 A1      Jun. 9, 2022

(30) Foreign Application Priority Data

Mar. 26, 2019   (JP) .................... 2019-058805

(51) Int. Cl.
*H01M 4/36*     (2006.01)
*H01M 4/02*     (2006.01)
(Continued)

(52) U.S. Cl.
CPC ............. *H01M 4/364* (2013.01); *H01M 4/13* (2013.01); *H01M 4/139* (2013.01); *H01M 4/483* (2013.01);
(Continued)

(58) Field of Classification Search
None
See application file for complete search history.

(56) References Cited

U.S. PATENT DOCUMENTS

2009/0197181 A1*  8/2009  Sakitani ............... H01M 4/624
                                                                29/623.5
2016/0156018 A1   6/2016  Kim
(Continued)

FOREIGN PATENT DOCUMENTS

CA    2866600 A1 *  9/2013  ........ H01M 10/4235
EP    3712990 A1     9/2020
(Continued)

OTHER PUBLICATIONS

Machine translation of JP 2015133280A (Year: 2015).*
(Continued)

*Primary Examiner* — Gregg Cantelmo
(74) *Attorney, Agent, or Firm* — WHDA, LLP

(57) ABSTRACT

This secondary battery comprises an electrode body that includes a positive electrode, a negative electrode, and a separator. The positive electrode has a positive electrode core, and a positive electrode mixture layer provided on the surface of the positive electrode core. The positive electrode mixture layer includes a positive electrode active material configured by secondary particles in which primary particles are aggregated. The packing density of the positive electrode active material in the positive electrode mixture layer is 3.2 g/cm³ or greater, and the crush rate of 30 pieces of the positive electrode active material existing on the surface of the positive electrode is 75% or less.

5 Claims, 3 Drawing Sheets

(51) Int. Cl.
*H01M 4/13* (2010.01)
*H01M 4/131* (2010.01)
*H01M 4/139* (2010.01)
*H01M 4/1391* (2010.01)
*H01M 4/48* (2010.01)
*H01M 4/62* (2006.01)
*H01M 10/0525* (2010.01)

(52) U.S. Cl.
CPC ......... *H01M 4/62* (2013.01); *H01M 10/0525* (2013.01); *H01M 2004/028* (2013.01); *H01M 4/131* (2013.01); *H01M 4/1391* (2013.01)

(56) References Cited

U.S. PATENT DOCUMENTS

| | | | |
|---|---|---|---|
| 2017/0309915 A1* | 10/2017 | Lee | H01M 10/052 |
| 2018/0190976 A1 | 7/2018 | Blangero et al. | |
| 2018/0287202 A1 | 10/2018 | Matsushita et al. | |
| 2019/0207202 A1* | 7/2019 | Wang | H01M 4/525 |
| 2020/0020924 A1 | 1/2020 | Takezawa et al. | |
| 2020/0388830 A1 | 12/2020 | Lee et al. | |

FOREIGN PATENT DOCUMENTS

| | | | |
|---|---|---|---|
| JP | 2013-065468 A | | 4/2013 |
| JP | 2014007034 A | * | 1/2014 |
| JP | 2014-143063 A | | 8/2014 |
| JP | 2015133280 A | * | 7/2015 |
| JP | 2016-103479 A | | 6/2016 |
| JP | 5959953 B2 | | 8/2016 |
| JP | 2017-107727 A | | 6/2017 |
| WO | 2018/179900 A1 | | 10/2018 |
| WO | 2019/151834 A1 | | 8/2019 |

OTHER PUBLICATIONS

Machine Translation of JP-2014007034-A (Year: 2014).*
Extended (Supplementary) European Search Report dated May 23, 2022, issued in counterpart EP application No. 20776396.2. (9 pages).
English Translation of Chinese Search Report dated Dec. 1, 2023, issued in counterpart CN application No. 202080024307.9. (3 pages).
International Search Report dated Mar. 31, 2020, issued in counterpart application No. PCT/JP2020/002662 (2 pages).

* cited by examiner

SECONDARY BATTERY

TECHNICAL FIELD

The present disclosure relates to a secondary battery, and more particularly to a secondary battery comprising a positive electrode having a high packing density of a positive electrode active material.

BACKGROUND ART

A positive electrode constituting a secondary battery generally comprises a metal electrode core and a mixture layer provided on a surface of the electrode core. The mixture layer includes a positive electrode active material mainly composed of a lithium-containing transition metal composite oxide. Patent Literature 1, for example, discloses a non-aqueous electrolyte secondary battery comprising a positive electrode including a positive electrode active material which is composed of a lithium-containing transition metal composite oxide having an $\alpha$-NaFeO$_2$ crystalline structure and represented by a compositional formula of $Li_{1+\alpha}Me_{1-\alpha}O_2$ and for which the crushing rate of particles is 40% or lower when pressed at a pressure of 40 kN/cm$^2$.

CITATION LIST

Patent Literature

PATENT LITERATURE 1: Japanese Patent No. 5959953

SUMMARY

A secondary battery such as a lithium ion battery is required to have a larger battery capacity by increasing a packing density of a positive electrode active material in a mixture layer. However, when the mixture layer is strongly compressed to increase the packing density of the positive electrode active material, the positive electrode active material that is present particularly on a surface of the mixture layer is likely to break. Hence, when the positive electrode active material is crushed, an electron conductivity of the mixture layer decreases to make it difficult to achieve a larger capacity. The technique disclosed in Patent Literature 1 is hard to apply to a positive electrode having a high packing density; thus, there is still a room for improvement in enlarging a battery capacity.

A secondary battery of an aspect of the present disclosure is a secondary battery, comprising a positive electrode having a positive electrode core and a positive electrode mixture layer provided on a surface of the positive electrode core, in which: the positive electrode mixture layer includes a positive electrode active material composed of secondary particles formed by aggregating primary particles; a packing density of the positive electrode active material in the positive electrode mixture layer is 3.2 g/cm$^3$ or higher; and a crushing rate of 30 particles of the positive electrode active material that is present on a surface of the positive electrode mixture layer is 75% or lower.

An aspect of the present disclosure may provide a secondary battery having a large capacity.

DESCRIPTION OF EMBODIMENTS

As mentioned above, enlarging a capacity is an essential object for a secondary battery such as a lithium ion battery. The present inventors have intensively investigated on enlarging a battery capacity, and as a result, have successfully achieved enlarging the battery capacity by setting the packing density of a positive electrode active material in a positive electrode mixture layer to 3.2 g/cm$^3$ or higher, as well as setting the crushing rate of the positive electrode active material that is present on a surface of the positive electrode mixture layer to 75% or lower. Hereinafter, an example of an embodiment of the secondary battery according to the present disclosure will be described in detail.

Hereinafter, a cylindrical battery in which a wound-type electrode assembly 14 is housed in a bottomed cylindrical exterior housing can 16 will be exemplified, but an exterior housing body is not limited to the cylindrical exterior housing can and may be an exterior housing can having a shape of, for example, rectangle, coin, or the like, and may be an exterior housing body composed of a laminated sheet. The electrode assembly may be a laminated-type electrode assembly in which a plurality of positive electrodes and a plurality of negative electrodes are alternatively laminated with a separator interposed therebetween. In the present specification, the surface of the positive electrode mixture layer means a surface on an opposite side to an electrode current controller positioned outside the positive electrode.

Figure 1:
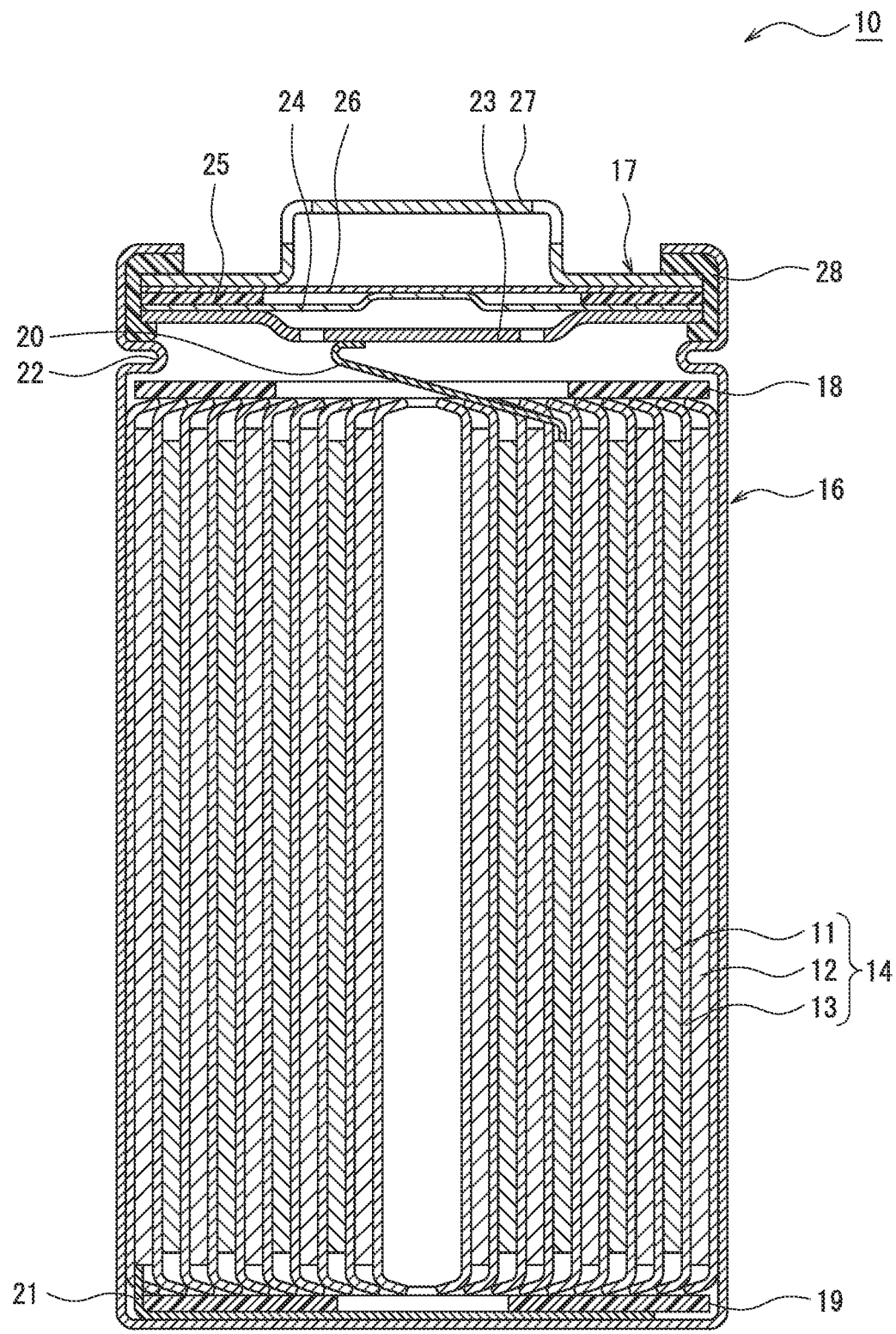
FIG. 1 is a sectional view of a secondary battery of an example of an embodiment.

FIG. 1 is a sectional view of a secondary battery 10 of an example of an embodiment. As exemplified in FIG. 1, the secondary battery 10 comprises an electrode assembly 14, an electrolyte, and an exterior housing can 16 housing the electrode assembly 14 and the electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metal container in which one side in the axial direction is opened, and an opening of the exterior housing can 16 is sealed with a sealing assembly 17. Hereinafter, a side of the sealing assembly 17 of the secondary battery 10 will be described as an upper side, and a bottom side of the exterior housing can 16 will be described as a lower side, for explanatory convenience.

For the electrolyte, a non-aqueous electrolyte is used, for example. The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like may be used, for example. The non-aqueous solvent may contain a halogen-substituted solvent in which at least some of the hydrogen atoms in these solvents are replaced by halogen atoms such as fluorine. The non-aqueous electrolyte is not limited to a liquid electrolyte, and may be a solid electrolyte. For the electrolyte salt, a lithium salt such as LiPF$_6$ is used, for example.

Each of the positive electrode 11, negative electrode 12, and separator 13 constituting the electrode assembly 14 is a band-shaped elongated body, and spirally wound to be laminated alternatively in the radial direction of the electrode assembly 14. The electrode assembly 14 has a positive electrode lead 20 connected to the positive electrode 11 by welding or the like and a negative electrode lead 21 connected to the negative electrode 12 by welding or the like. To prevent precipitation of lithium, the negative electrode 12 is formed to be in one size larger than the positive electrode 11. In other words, the negative electrode 12 is formed to be longer in the longitudinal and width directions than the positive electrode 11. Two separators 13 are formed to be in one size larger than at least the positive electrode 11, and disposed for sandwiching the positive electrode 11, for example.

On upper and lower sides of the electrode assembly 14, insulating plates 18 and 19 are disposed, respectively. In the example illustrated in FIG. 1, the positive electrode lead 20 connected to the positive electrode 11 extends toward a side of the sealing assembly 17 through a through hole of the insulating plate 18, and the negative electrode lead 21 connected to the negative electrode 12 extends toward a bottom side of the exterior housing can 16 through an outside of the insulating plate 19. The positive electrode lead 20 is connected to a lower face of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner face of the exterior housing can 16 by welding or the like, and the exterior housing can 16 becomes a negative electrode terminal.

A gasket 28 is provided between the exterior housing can 16 and the sealing assembly 17 to ensure sealability inside the battery. On the exterior housing can 16, a grooved part 22 inside which a part of a side face thereof projects is formed for supporting the sealing assembly 17. The grooved part 22 is preferably formed circularly along the circumferential direction of the exterior housing can 16, and supports the sealing assembly 17 with an upper face thereof. The sealing assembly 17 is fixed on an upper part of the exterior housing can 16 with the grooved part 22 and an end part, swaged to the sealing assembly 17, of an opening of the exterior housing can 16.

The sealing assembly 17 has a structure in which the internal terminal plate 23, a lower vent member 24, an insulating member 25, an upper vent member 26, and the cap 27 are laminated in this order from a side of the electrode assembly 14. Each member constituting the sealing assembly 17 has, for example, a disc shape or a ring shape, and each member except for the insulating member 25 is electrically connected to each other. The lower vent member 24 and the upper vent member 26 are connected to each other at each of the central parts thereof, and the insulating member 25 is interposed between each of the circumferential parts thereof. When an internal pressure of the battery increases due to abnormal heat generation, the lower vent member 24 is deformed so as to push the upper vent member 26 up toward the side of the cap 27 and breaks, and thereby a current pathway between the lower vent member 24 and the upper vent member 26 is cut off. When the internal pressure further increases, the upper vent member 26 breaks, and gas is discharged from an opening of the cap 27.

Figure 2:
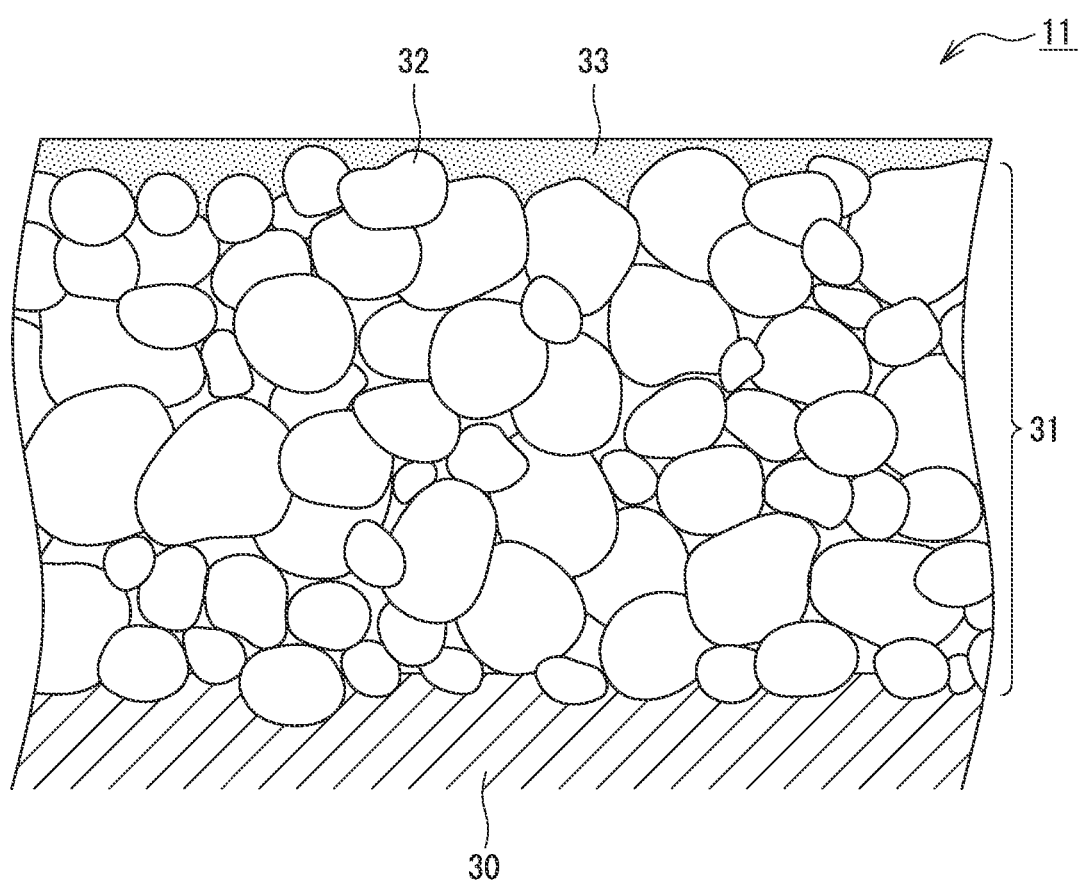
FIG. 2 is a sectional view schematically illustrating a positive electrode of an example of an embodiment (Example 1).

Hereinafter, the positive electrode 11, negative electrode 12, and separator 13 constituting the electrode assembly 14 will be described in detail with reference to FIG. 2. FIG. 2 is a sectional view of the positive electrode 11 of an example of an embodiment.

[Positive Electrode]

As exemplified in FIG. 2, the positive electrode 11 has a positive electrode core 30 and a positive electrode mixture layer 31 provided on a surface of the positive electrode core 30. For the positive electrode core 30, a foil of a metal stable within a potential range of the positive electrode 11, such as aluminum, a film in which such a metal is disposed on a surface layer thereof, and the like may be used. A thickness of the positive electrode core 30 is, for example, 10 µm to 30 µm. The positive electrode mixture layer 31 includes a positive electrode active material 32, a conductive agent, and a binder, and is preferably provided on both surfaces of the positive electrode core 30 except for a portion to which the positive electrode lead 20 is connected. In the example illustrated in FIG. 2, a surface layer 33 is provided on a surface of the positive electrode mixture layer 31.

The positive electrode mixture layer 31 is mainly composed of a positive electrode active material 32. The content of the positive electrode active material 32 in the positive electrode mixture layer 31 is preferably 80 mass % or more, and more preferably 90 to 99 mass % based on a mass of the positive electrode mixture layer 31. Setting a packing density of the positive electrode active material 32 in the positive electrode mixture layer 31 to 3.2 g/cm$^3$ or higher and setting a crushing rate of the positive electrode active material 32 that is present on the surface of the positive electrode mixture layer 31 to 75% or lower may achieve a larger battery capacity, and details will be described later.

The positive electrode active material 32 included in the positive electrode mixture layer 31 is mainly composed of a lithium-containing transition metal composite oxide. Examples of a metal element contained in the lithium-containing transition metal composite oxide include Ni, Co, Mn, Al, B, Mg, Ti, V, Cr, Fe, Cu, Zn, Ga, Sr, Zr, Nb, In, Sn, Ta, and W. A preferable example of the lithium-containing transition metal composite oxide is a composite oxide containing at least one of the group consisting of Ni, Co, and Mn. Specific examples thereof include: a lithium-containing transition metal composite oxide containing Ni, Co, and Mn; and a lithium-containing transition metal composite oxide containing Ni, Co, and Al.

The positive electrode active material 32 is composed of secondary particles formed by aggregating primary particles. The primary particles constituting the positive electrode active material 32 may be observed by a scanning electron microscope (SEM). An average particle diameter of the primary particles may be determined by: randomly selecting 100 primary particles on a SEM image of the positive electrode active material 32; measuring a circumscribed circle diameter of each of the particles; and averaging the measured values. The average particle diameter of the primary particles is, for example, 0.05 µm to 5 µm, and preferably 0.1 µm to 3 µm.

A median diameter (hereinafter, referred to as "D50") on a volumetric basis of the positive electrode active material 32 (the secondary particles) is, for example, 5 µm to 30 µm, and preferably 10 µm to 25 µm. The D50 on a volumetric basis, also referred to as an intermediate diameter, means a particle diameter at which a cumulative frequency is 50% from the smallest particle diameter in a particle diameter distribution on a volumetric basis. The D50 may be measured by using a laser diffraction-type particle size distribution measuring device (for example, MICROTRAC HRA, manufactured by NIKKISO CO., LTD.) with water as a dispersion medium.

Examples of the conductive agent included in the positive electrode mixture layer 31 may include a carbon material such as carbon black, acetylene black, Ketjenblack, and graphite. Among them, acetylene black is preferably used. The content of the conductive agent is, for example, 0.5 to 3 mass % based on a mass of the positive electrode mixture layer 31.

Examples of the binder included in the positive electrode mixture layer 31 may include a fluororesin such as polytetrafluoroethylene (PTFE) and polyvinylidene fluoride (PVdF), polyacrylonitrile (PAN), a polyimide, an acrylic resin, and a polyolefin. Among them, a fluororesin such as PVdF is preferable. With these resins, a cellulose derivative such as carboxymethyl cellulose (CMC) or a salt thereof, a polyethylene oxide (PEO), and the like may be used in combination. The content of the binder is, for example, 0.5 to 3 mass % based on a mass of the positive electrode mixture layer 31.

The average thickness of the positive electrode mixture layer 31 is, for example, at one side of the positive electrode core 30, 30 μm to 100 μm, preferably 40 μm to 90 μm, and more preferably 50 μm to 80 μm. The positive electrode mixture layer 31 is typically provided on both of the surfaces of the positive electrode core 30 with a substantially same thickness. The average thickness of the positive electrode mixture layer 31 is measured by using a scanning electron microscope (SEM) photography of a section of the positive electrode in which a longitudinal range of 160 μm or longer in the longitudinal direction of the positive electrode 11 may be observed. In the sectional SEM image of the positive electrode 11, a length from a lower end to an upper end of the positive electrode mixture layer 31 was measured, and an average value of the lengths measured at random 40 points was determined as the average thickness of the positive electrode mixture layer 31.

The packing density of the positive electrode active material 32 in the positive electrode mixture layer 31 is 3.2 g/cm$^3$ or higher, and preferably 3.5 g/cm$^3$ or higher. A higher packing density of the positive electrode active material 32 may achieve a larger capacity. On the other hand, increasing the packing density of the positive electrode active material 32 causes particularly the positive electrode active material 32 that is present on the surface of the positive electrode mixture layer 31 to be likely to break; however, the present embodiment may prevent the positive electrode active material 32 from breaking, as well as may increase the packing density. The upper limit value of the packing density is not particularly limited, and is, for example, 3.9 g/cm$^3$ or 3.7 g/cm$^3$.

The packing density of the positive electrode active material 32 in the positive electrode mixture layer 31 may be determined by: dissolving the positive electrode 11 having a predetermined area in aqua regia; determining the amount of an element constituting the positive electrode active material by ICP emission spectroscopy analysis; calculating a weight of the active material per the predetermined area; and calculating the packing density with the average thickness of the positive electrode mixture layer 31. When the positive electrode 11 has the surface layer 33, a mass of the surface layer 33 must also be subtracted. The mass of the surface layer 33 may be determined by using a calibration curve derived from X-ray fluorescence intensities of a surface layer having a known basis weight (mass per unit area). For the X-ray fluorescence measurement of the surface layer 33, an X-ray fluorescence analyzer manufactured by Rigaku Corporation is used, for example.

As exemplified in FIG. 2, the positive electrode 11 includes the positive electrode active material 32 that is present on the surface of the positive electrode mixture layer 31 having a few broken particles, and the crushing rate of the positive electrode active material 32 is 75% or lower. The positive electrode active material 32 that is present on the surface of the positive electrode mixture layer 31 is likely to break during the step of compressing the mixture layer; however, the present embodiment may allow, for example, the surface layer 33 to function as a cushioning layer to prevent breaking and to lower the crushing rate. Setting the crushing rate of the positive electrode active material 32 that is present on the surface of the positive electrode mixture layer 31 to 75% or lower may sustain a good electron conductivity of the positive electrode mixture layer 31, resulting in achievement of a larger battery capacity.

The crushing rate of the positive electrode active material 32 is evaluated by using an electron microscope photography of a section of the positive electrode (magnification: 700) on randomly selected 30 particles that are present on the surface of the positive electrode mixture layer 31. When the surface layer 33 is provided, the surface of the positive electrode mixture layer 31 is contacted with the surface layer 33. The crushing rate is a rate of crushed particles in 30 particles of the positive electrode active material 32. Here, the crushed particle means a particle that is not sustain a shape of the secondary particle, for example, a particle in which the secondary particle is separated into fragments, and a particle in which an inside thereof is exposed by a crack or fissure on the secondary particle.

The crushing rate of the positive electrode active material 32 that is present on the surface of the positive electrode mixture layer 31 is preferably 55% or lower, and more preferably 35% or lower. A lower limit value of the crushing rate is not particularly limited, and ideally 0%. In the present embodiment, the crushing rate of a positive electrode active material 32 that is present apart from the surface of the positive electrode mixture layer 31 is lower than the crushing rate of the positive electrode active material 32 that is present on the surface. The crushing rate of the positive electrode active material 32 that is present apart from the surface of the positive electrode mixture layer 31 may be determined with any 30 or more particles of the positive electrode active material 32 (having a particle diameter of 5 μm to 15 μm) that is present on a surface on a side of the electrode core, of the positive electrode mixture layer 31 contacting with the positive electrode core 30. The crushing rate of the positive electrode active material 32 that is present apart from the surface of the positive electrode mixture layer 31 may also be determined with any 30 or more particles of the positive electrode active material 32 (having a particle diameter of 5 μm to 15 μm) that is present at a half position in a thickness of the positive electrode mixture layer 31.

As the positive electrode active material 32 has a larger particle diameter, the crushing rate tends to be higher. The crushing rate of any 30 or more particles selected from the positive electrode active material 32 that is present on the surface of the positive electrode mixture layer 31 and that has a particle diameter of 5 μm to 15 μm is, for example, 70% or lower, preferably 50% or lower, and more preferably 30% or lower. A particle diameter of the positive electrode active material 32 used for evaluating the crushing rate is a circumscribed circle diameter of the active material particle measured on a SEM image of a section of the positive electrode mixture layer 31.

The positive electrode mixture layer 31 is formed by, for example, applying a positive electrode mixture slurry including the positive electrode active material 32, the conductive agent, the binder, and the like on a surface of the positive electrode core 30, and drying the applied film. The applied film of the positive electrode mixture layer 31 is generally compressed for increasing the packing density of the positive electrode active material 32; however, simply compressing the applied film causes the positive electrode active material 32 that is present on the surface of the positive electrode mixture layer 31 to break, and increases the crushing rate. In the present embodiment, providing the surface layer 33 on the surface of the positive electrode mixture layer 31 may allow the surface layer 33 to function as a cushioning layer to lower the crushing rate of the positive electrode active material 32.

The positive electrode 11 is manufactured by, for example, the following steps:
(1) applying the positive electrode mixture slurry including the positive electrode active material 32, the conductive agent, the binder, and the like on each of both surfaces of the positive electrode core 30 to form an applied film of the positive electrode mixture layer 31, and drying the applied film;
(2) applying a slurry for the surface layer including an inorganic compound to constitute the surface layer 33 and the binder on a surface of the applied film of the positive electrode mixture layer 31 to form an applied film of the surface layer 33, and drying the applied film; and
(3) compressing the applied films of the positive electrode mixture layer 31 and the surface layer 33 so that the packing density of the positive electrode active material 32 in the positive electrode mixture layer 31 is 3.2 g/cm$^3$ or higher.

By the above steps, the positive electrode 11 in which the positive electrode mixture layer 31 and the surface layer 33 are formed in this order on both surfaces of the positive electrode core 30 is manufactured. The surface layer 33 may be removed after compressing the positive electrode mixture layer 31.

The average thickness of the surface layer 33 is, at one side of the positive electrode core 30, preferably 0.1 μm to 10 μm, more preferably 0.5 μm to 9 μm, and particularly preferably 1 μm to 8 μm. If the surface layer 33 is exceedingly thin, the function as a cushioning layer is deteriorated and it is difficult to prevent breaking of the positive electrode active material 32 during the step of compressing the positive electrode 11. The average thickness of the surface layer 33 is measured in the same manner as of the average thickness of the positive electrode mixture layer 31.

Although the surface layer 33 may be removed after the compressing step, the surface layer 33 is preferably not removed to remain on the surface of the positive electrode mixture layer 31 in the viewpoint of reduction in manufacturing cost due to elimination of a removing step, prevention of an internal short circuit, suppression of heat generation with a short circuit, and the like. The preferable surface layer 33 is mainly composed of an inorganic compound, has lower electroconductivity than the positive electrode mixture layer 31, and is more preferably an insulative layer. The surface layer 33 covers the entire surface of the positive electrode mixture layer 31 to constitute the outermost layer of the positive electrode 11. The surface layer 33 includes, for example, an inorganic compound and the binder, and the surface thereof is substantially plain.

The content of the inorganic compound in the surface layer 33 is preferably 80 mass % or more, and more preferably 90 to 99 mass % based on a mass of the surface layer 33. A basis weight of the inorganic compound (a mass per unit area of the positive electrode 11) is preferably 3 g/m$^3$ or more, preferably 8 g/m$^3$ or more, and for example, 3 to 13 g/m$^3$. If the basis weight of the inorganic compound is exceedingly small, the function of the surface layer 33 as a cushioning layer is deteriorated and it is difficult to prevent breaking of the positive electrode active material 32 during the step of compressing the positive electrode 11.

The inorganic compound included in the surface layer 33 is a compound in which no insertion and deinsertion of Li occur with solid-phase oxidation-reduction at a potential of 2.5 V (vs. Li/Li$^+$) or higher, as well as a compound that has no function as the positive electrode active material 32. The inorganic compound is, for example, at least one selected from the group consisting of an oxide, hydroxide, oxyhydroxide, borate, phosphate, and sulfate containing a metal element. D50 on a volumetric basis of the inorganic compound is preferably 0.05 μm to 1 μm, and more preferably 0.1 μm to 0.8 μm. In such a case, a porosity and a pore diameter of the surface layer 33 are easy to be regulated within an intended range.

Specific examples of the inorganic compound include: an oxide such as titanium oxide ($TiO_2$), aluminum oxide ($Al_2O_3$), tin oxide ($SnO_2$), tungsten oxide ($WO_3$), niobium oxide ($Nb_2O_5$), molybdenum oxide ($MoO_3$), and silicon oxide ($SiO_2$); a hydroxide such as magnesium hydroxide ($Mg(OH)_2$); an oxyhydroxide such as boehmite (AlOOH); a phosphate such as lithium phosphate ($Li_3PO_4$), ammonium polyphosphate, sodium tripolyphosphate, melamine polyphosphate, lithium metaphosphate (($LiPO_3)_n$), and potassium dihydrogenphosphate ($KH_2PO_4$); a sulfate such as barium sulfate ($BaSO_4$); a melamine salt compound such as melamine cyanurate; and a borate such as sodium borate ($Na_2B_4O_7$). Among them, at least one selected from the group consisting of $TiO_2$, AlOOH, $Li_3PO_4$, $Mg(OH)_2$, and $BaSO_4$ is preferable.

For the binder included in the surface layer 33, the same type of the binder as employed for the positive electrode mixture layer 31, and for example, a fluororesin such as PTFE and PVdF, PAN, a polyimide, an acrylic resin, and a polyolefin may be used. The content of the binder is, for example, 0.5 to 3 mass % based on a mass of the surface layer 33.

The surface layer 33 is a porous layer, which allows the electrolyte to permeate therethrough. A porosity of the surface layer 33 is, for example, 25 to 55%, and preferably 30 to 45% in the viewpoint of reduction in an internal resistance, suppression of heat generation with an internal short circuit, and the like. The porosity of the surface layer 33 is measured by the following method:
(1) determining a basis weight of the inorganic compound particles included in the surface layer 33 with an X-ray fluorescence intensity by using a calibration curve derived from X-ray fluorescence intensities of a surface layer having a known basis weight;
(2) determining an absolute volume of the particle (Vt) with an absolute density and basis weight of the inorganic compound particles;
(3) determining an apparent volume of the surface layer 33 (Va) with an area and average thickness of the surface layer 33; and (4) calculating the porosity of the surface layer 33 (P) with the following formula.

$$P=100-100Vt/Va$$

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. A thickness of the negative electrode core is, for example, 5 μm to 25 μm. The negative electrode mixture layer includes a negative electrode active material and a binder, and is preferably provided on, for example, both surfaces of the negative electrode core except for a portion to which the negative electrode lead 21 is connected.

The negative electrode mixture layer includes, for example, a carbon-based active material reversibly occluding and releasing lithium ions as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

D50 on a volumetric basis of the negative electrode active material is, for example, μm to 30 μm, and preferably 10 μm to 25 μm. A packing density of the negative electrode active material in the negative electrode mixture layer is preferably 1.2 g/cm$^3$ or higher. An upper limit value of the packing density is not particularly limited, and is, for example, 2.0 g/cm$^3$ or 1.7 g/cm$^3$.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR, and CMC or a salt thereof, or PAA or a salt thereof are preferably used in combination.

[Separator]

For the separator 13, a porous sheet having ion permeation property and insulation property is used. Specific examples of the porous sheet include a fine porous thin film, a woven fabric, and a nonwoven fabric. As a material of the separator 13, an olefin resin such as polyethylene and polypropylene, cellulose, and the like are preferable. The separator 13 may have any of a single-layered structure and a laminated structure. On a surface of the separator 13, a heat-resistant layer or the like may be formed.

EXAMPLES

Hereinafter, the present disclosure will be described in more detail with Examples, but the present disclosure is not limited to these Examples.

Example 1

[Production of Positive Electrode]

Adding lithium hydroxide into a precursor produced by a coprecipitation method to mix and firing the mixture were performed to synthesize a lithium-containing transition metal composite oxide (D50 on a volumetric basis: 10 μm) represented by $Ni_{0.88}Co_{0.09}Al_{0.03}O_2$, composed of secondary particles formed by aggregating primary particles, and the product was used as the positive electrode active material. Mixing 100 parts by mass of the positive electrode active material, 1 part by mass of acetylene black, and 1 part by mass of polyvinylidene fluoride was performed, and N-methyl-2-pyrrolidone (NMP) was used as a dispersion medium to prepare a positive electrode mixture slurry. Then, this positive electrode mixture slurry was applied on both surfaces of the positive electrode core made of an aluminum foil with an amount of 0.028 g/cm$^2$ at each surface to form a positive electrode mixture layer on both surfaces of the positive electrode core.

For the inorganic compound constituting a surface layer, titanium oxide ($TiO_2$, D50 on a volumetric basis: 0.2 μm) was used. Mixing 100 parts by mass of the titanium oxide and 3 parts by mass of polyvinylidene fluoride was performed, and NMP was used as a dispersion medium to prepare a slurry for the surface layer. Then, this slurry was applied on a surface of the positive electrode mixture layer so that the amount of the inorganic compound was 8 g/m$^2$, and the applied film was dried to form a surface layer on the surface of the positive electrode mixture layer. Thereafter, the positive electrode mixture layer and the surface layer were compressed with a roll press to obtain a positive electrode in which the positive electrode mixture layer and the surface layer were formed in this order on both surfaces of the positive electrode core.

The positive electrode mixture layer had a density of 3.2 g/cm$^3$ and an average thickness of 70 μm, and the surface layer had an average thickness of 3 μm. As illustrated in FIG. 2, a few particles of the positive electrode active material on the surface of the positive electrode mixture layer were crushed, and the crushing rate per 30 particles was 30% (9 particles were crushed). These measurement results are shown in Table 1, described later, with the inorganic compound constituting the surface layer and an evaluation result of the battery capacity. Measuring methods of the crushing rate and the like are described above.

[Production of Negative Electrode]

As the negative electrode active material, graphite powder was used. Mixing 98.7 parts by mass of the negative electrode active material, 0.7 parts by mass of carboxymethyl cellulose (CMC), and 0.6 parts by mass of styrene-butadiene rubber (SBR) was performed, and water was used as a dispersion medium to prepare a negative electrode mixture slurry. Then, this negative electrode mixture slurry was applied on both surfaces of a negative electrode core made of a copper foil with an amount of 0.013 g/cm$^2$ at each surface, the applied film was dried, compressed, and then cut to a predetermined electrode size to obtain a negative electrode in which a negative electrode mixture layer was formed on both surfaces of the negative electrode core.

[Preparation of Non-Aqueous Electrolyte Liquid]

Ethylene carbonate (EC), ethyl methyl carbonate (EMC), and dimethyl carbonate (DMC) were mixed at a volumetric ratio of 3:3:4. Into this mixed solvent, $LiPF_6$ was dissolved so that the concentration thereof was 1.2 mol/L to prepare a non-aqueous electrolyte liquid.

[Production of Secondary Battery]

An aluminum lead was attached to the positive electrode, a nickel lead was attached to the negative electrode, and the electrodes were wound with a separator made of polyethylene having a thickness of 14 μm interposed therebetween to produce a wound-type electrode assembly. This electrode assembly was housed in a bottomed cylindrical exterior housing can having an outer diameter of 18.2 mm and a height of 65 mm, the non-aqueous electrolyte liquid was injected thereinto, and then an opening of the exterior housing can was sealed with a gasket and a sealing assembly to obtain a 18650-type cylindrical non-aqueous electrolyte secondary battery.

Examples 2 to 5

Positive electrodes and non-aqueous electrolyte secondary batteries were obtained in the same manner as in Example 1 except that compounds shown in Table 1 were used instead of $TiO_2$ as the inorganic compound constituting the surface layer.

Comparative Example 1

Figure 3:
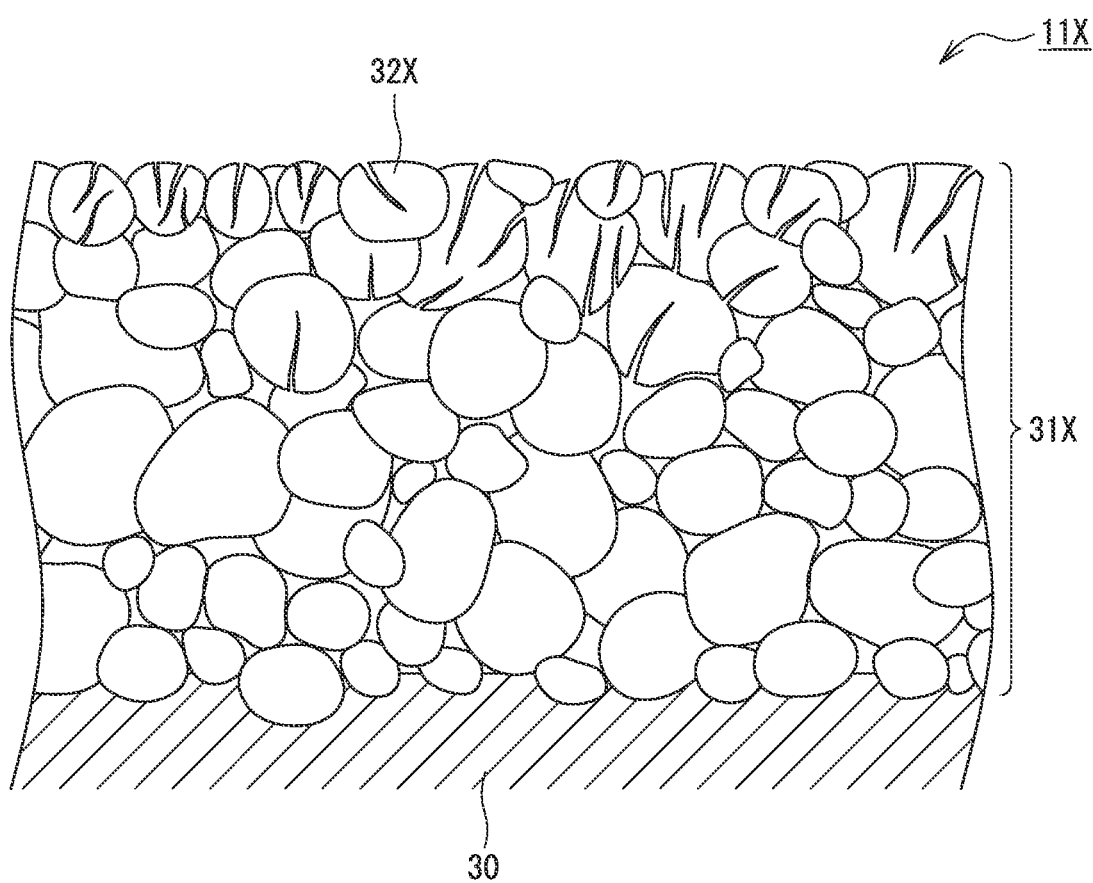
FIG. 3 is a sectional view schematically illustrating a positive electrode of Comparative Example 1.

A positive electrode and a non-aqueous electrolyte secondary battery were obtained in the same manner as in Example 1 except that no surface layer was formed in producing the positive electrode. FIG. 3 is a schematic view illustrating a section of the positive electrode of Comparative Example 1. As illustrated in FIG. 3, many particles of the positive electrode active material that is present on the surface of the positive electrode mixture layer were crushed, and the crushing rate per 30 particles was 76% (23 particles were crushed).

Examples 6 to 8

Positive electrodes and non-aqueous electrolyte secondary batteries were obtained in the same manner as in Example 2 except that, in producing the positive electrodes, the amount of the slurry applied and the pressure during compressing the applied films were changed so that the density of the positive electrode mixture layers was 3.5 $g/cm^3$. Measurement results such as the crushing rates of the positive electrode active materials are shown in Table 2, described later, with the inorganic compounds constituting the surface layers and evaluation results of the battery capacities.

Example 9

In producing the positive electrode, 100 parts by mass of boehmite (AlOOH, D50 on a volumetric basis: 0.5 μm) and 3 parts by mass of an acrylic resin were mixed, and water was used as a dispersion medium to prepare a slurry for a surface layer. Then, this slurry was applied on the surface of the positive electrode mixture layer so that the amount of the inorganic compound was 8 $g/m^2$, and the applied film was dried to form a surface layer on the surface of the positive electrode mixture layer. The positive electrode mixture layer and the surface layer were compressed with a roll press, and then an electrode plate was immersed in water and subjected to ultrasonic treatment for removing the surface layer to obtain a positive electrode in which only the positive electrode mixture layer was formed on both surfaces of the positive electrode core. Except for the above, a non-aqueous electrolyte secondary battery was obtained in the same manner as in Example 6.

Comparative Example 2

A positive electrode and a non-aqueous electrolyte secondary battery were obtained in the same manner as in Example 6 except that no surface layer was formed in producing the positive electrode.

Examples 10 to 12

Positive electrodes and non-aqueous electrolyte secondary batteries were obtained in the same manner as in Example 2 except that, in producing the positive electrodes, the amount of the slurry applied and the pressure during compressing the applied film were changed so that the density of the positive electrode mixture layers was 3.7 $g/cm^3$. Measurement results such as the crushing rates of the positive electrode active materials are shown in Table 3, described later, with the inorganic compounds constituting the surface layers and evaluation results of the battery capacities.

Comparative Example 3

A positive electrode and a non-aqueous electrolyte secondary battery were obtained in the same manner as in Example 10 except that no surface layer was formed in producing the positive electrode.

[Evaluation of Battery Capacity]

Each of the batteries of Examples and Comparative Examples was charged at a constant current of 1000 mA to a charge termination voltage of 4.2 V, and charged at a constant voltage of 4.2 V for 60 minutes. Then, the batteries were discharged at 1000 mA to a discharge termination voltage of 2.5 V to measure discharge capacities (mAh) of this time. The battery capacities of Examples in each Table are relative values with respect to the battery capacity of the corresponding Comparative Example in each Table as 100.

TABLE 1

| | Positive Electrode Active Material | | Inorganic Compound | | |
| --- | --- | --- | --- | --- | --- |
| | Packing Density | Crushing Rate | Composition | Basis Weight | Battery Capacity |
| Example 1 | 3.2 $g/cm^3$ | 30% | $TiO_2$ | 8 $g/m^2$ | 103% |
| Example 2 | 3.2 $g/cm^3$ | 27% | AlOOH | 8 $g/m^2$ | 103% |
| Example 3 | 3.2 $g/cm^3$ | 32% | $Li_3PO_4$ | 8 $g/m^2$ | 103% |
| Example 4 | 3.2 $g/cm^3$ | 30% | $Mg(OH)_2$ | 8 $g/m^2$ | 103% |
| Example 5 | 3.2 $g/cm^3$ | 27% | $BaSO_4$ | 8 $g/m^2$ | 103% |
| Comparative Example 1 | 3.2 $g/cm^3$ | 76% | — | — | 100% |

TABLE 2

| | Positive Electrode Active Material | | Inorganic Compound | | |
| --- | --- | --- | --- | --- | --- |
| | Packing Density | Crushing Rate | Composition | Basis Weight | Battery Capacity |
| Example 6 | 3.5 $g/cm^3$ | 32% | AlOOH | 13 $g/m^2$ | 103% |
| Example 7 | 3.5 $g/cm^3$ | 48% | AlOOH | 8 $g/m^2$ | 103% |
| Example 8 | 3.5 $g/cm^3$ | 72% | AlOOH | 3 $g/m^2$ | 102% |
| Example 9 | 3.5 $g/cm^3$ | 50% | Surface Layer Removed | | 103% |
| Comparative Example 2 | 3.5 $g/cm^3$ | 80% | — | — | 100% |

TABLE 3

| | Positive Electrode Active Material | | Inorganic Compound | | |
| --- | --- | --- | --- | --- | --- |
| | Packing Density | Crushing Rate | Composition | Basis Weight | Battery Capacity |
| Example 10 | 3.7 $g/cm^3$ | 36% | AlOOH | 13 $g/m^2$ | 103% |
| Example 11 | 3.7 $g/cm^3$ | 55% | AlOOH | 8 $g/m^2$ | 102% |
| Example 12 | 3.7 $g/cm^3$ | 75% | AlOOH | 3 $g/m^2$ | 101% |
| Comparative Example 3 | 3.7 $g/cm^3$ | 85% | — | — | 100% |

As shown in Tables 1 to 3, any of the batteries of Examples has larger capacity than the corresponding battery of Comparative Example. Lowering the crushing rate of the positive electrode active material that is present on the surface of the positive electrode mixture layer to 75% or lower may sustain a good electron conductivity of the mixture layer, resulting in achievement of the larger battery capacity. In addition, the lower the crushing rate of the positive electrode active material is, the larger the battery capacity is. Even when the surface layer was removed from the surface of the mixture layer (Example 9), the same effect was achieved as those of the other Examples.

As shown in Table 1, although a composition of the inorganic compound included in the surface layer does not significantly affect the crushing rate of the positive electrode active material, the larger the basis weight of the inorganic compound is, the lower the crushing rate is (see Examples 6 to 8, and 10 to 12). In other words, it is considered that a thicker surface layer allows the surface layer to be likely to function as a cushioning layer during the step of compressing the positive electrode mixture layer, and to prevent the positive electrode active material from breaking.

REFERENCE SIGNS LIST

- 10 Secondary battery
- 11 Positive electrode
- 12 Negative electrode
- 13 Separator
- 14 Electrode assembly
- 16 Exterior housing can
- 17 Sealing assembly
- 18, 19 Insulating plate
- 20 Positive electrode lead
- 21 Negative electrode lead
- 22 Grooved part
- 23 Internal terminal plate
- 24 Lower vent member
- 25 Insulating member
- 26 Upper vent member
- 27 Cap
- 28 Gasket
- 30 Positive electrode core
- 31 Positive electrode mixture layer
- 32 Positive electrode active material
- 33 Surface layer

The invention claimed is:

1. A secondary battery, comprising:
a positive electrode having a positive electrode core and a positive electrode mixture layer provided on a surface of the positive electrode core, wherein:
the positive electrode mixture layer includes a positive electrode active material composed of secondary particles formed by aggregating primary particles;
a packing density of the positive electrode active material in the positive electrode mixture layer is 3.2 g/cm$^3$ or higher; and
a crushing rate of 30 particles of the positive electrode active material being present on a surface of the positive electrode mixture layer is 75% or lower,
wherein a surface layer including an inorganic compound and a binder is provided on a surface of the positive electrode mixture layer, wherein the surface layer is porous, and
a basis weight of the inorganic compound is 3 to 13 g/m$^2$,
wherein a crushing rate of 30 particles of the positive electrode active material being present apart from the surface of the positive electrode mixture layer is lower than a crushing rate determined with 30 particles of the positive electrode active material being present on the surface of the positive electrode mixture layer.

2. The secondary battery according to claim 1, wherein the inorganic compound is a compound in which no insertion and deinsertion of Li occur with solid-phase oxidation-reduction at a potential of 2.5 V (vs. Li/Li$^+$) or higher, and which is at least one selected from the group consisting of an oxide, hydroxide, oxyhydroxide, borate, phosphate, and sulfate containing a metal element.

3. The secondary battery according to claim 2, wherein the inorganic compound is at least one selected from the group consisting of $TiO_2$, AlOOH, $Li_3PO_4$, $Mg(OH)_2$, and $BaSO_4$.

4. The secondary battery according to claim 1, wherein the packing density of the positive electrode active material in the positive electrode mixture layer is 3.5 g/cm$^3$ or higher.

5. The secondary battery according to claim 1, wherein the crushing rate is 55% or lower.

* * * * *